No. 870,280. PATENTED NOV. 5, 1907.
R. D. GALLAGHER, Sr.
BROOM CORN FIBER SORTING AND SIZING MACHINE.
APPLICATION FILED MAY 17, 1905.

No. 870,280. PATENTED NOV. 5, 1907.
R. D. GALLAGHER, Sr.
BROOM CORN FIBER SORTING AND SIZING MACHINE.
APPLICATION FILED MAY 17, 1905.

Witnesses
Inventor
Richard D. Gallagher, Sr.
by his Attorney

No. 870,280. PATENTED NOV. 5, 1907.
R. D. GALLAGHER, Sr.
BROOM CORN FIBER SORTING AND SIZING MACHINE.
APPLICATION FILED MAY 17, 1905.

Witnesses
Scott Haycock
J. F. Brandenburg

Inventor
Richard D. Gallagher, Sr.,
by
his Attorney

No. 870,280. PATENTED NOV. 5, 1907.
R. D. GALLAGHER, Sr.
BROOM CORN FIBER SORTING AND SIZING MACHINE.
APPLICATION FILED MAY 17, 1905.

Witnesses
Scott Haycock
J. F. Brandenburg

Inventor
Richard D. Gallagher, Sr.,
by
his Attorney

UNITED STATES PATENT OFFICE.

RICHARD D. GALLAGHER, SR., OF LAMAR, COLORADO.

BROOM-CORN-FIBER SORTING AND SIZING MACHINE.

No. 870,280.　　　Specification of Letters Patent.　　　Patented Nov. 5, 1907.

Application filed May 17, 1905. Serial No. 260,899.

*To all whom it may concern:*

Be it known that I, RICHARD D. GALLAGHER, Sr., a citizen of the United States, residing at Lamar, in the county of Prowers and State of Colorado, have invented certain new and useful Improvements in Broom-Corn-Fiber Sorting and Sizing Machines; and I do hereby declare the following to be a full, clear, and exact description of the invention, such as will enable others skilled in the art to which it appertains to make and use the same.

This invention relates to means for sorting and sizing broom-corn fibers, and has been illustrated in the accompanying drawings embodied in a machine which separates the fibers from their stalks, sorts the fibers into grades with reference to size, and finally brings the fibers of each grade exactly to a size.

The object of the invention is to provide mechanism for sorting and sizing broom-corn fibers, which will permit the flexible tips of all the fibers to be retained.

In broom manufacture, as usually practiced, the fibers, attached to their stalks, are secured to the handle of the broom and the brush ends are then trimmed off to give an even sweeping surface, in this way, sacrificing a large part of the best sweeping portion of the fibers. To obviate this serious loss, I propose to sort the fibers as individual fibers, and, in the final operation, the fibers are to be assembled along their natural fine tips and trimmed to a size along their butt-ends.

In the preferred embodiment of my invention, the fibers attached to their stalks are subjected to the action of a comber for straightening the fibers, and then to a separator, which severs them from their stalks; the separated fibers are then allowed to fall through a screen, which removes portions of stalk and other undesirable matter, are assembled in alinement along their butt-ends, and are then carried over a series of graduated openings, whereby the fibers are sorted into grades; and, finally, the fibers of each grade are assembled in alinement along their tip ends and trimmed evenly along their butt-ends. However, I do not regard it as essential that all these instrumentalities shall be embodied in one machine; indeed, complete mechanisms may be formed by combining only certain of these agencies: and, of course, the specific form of each device may be varied widely.

Coming now to a brief identification of the views in the accompanying drawings.

Figure 9:
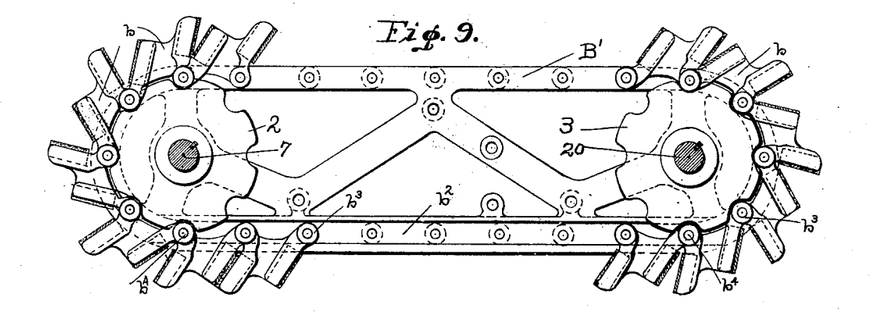
Fig. 9 is a side elevation of the gripper feeding device, the front guide plate being removed to show clearly the gripper chain, only a few links of which are illustrated.

Having reference now to the drawings, A is the feeding table upon which the fibers attached to their stalks are fed to the endless gripper feeding device B, mounted on upright sprockets 2 and 3 above the top of the table, and driven by belt 4, which extends from pulley 5 towards the rear of the machine and passes around pulley 6 on the end of shaft 7 of the forward sprocket 2. This feeding device preferably comprises links $b$, each of which is provided with a pair of gripping faces $b^1$, so disposed that, by the act of straightening the chain, the gripping faces on each link clamp forcibly against the faces on the two adjoining links (shown more particularly in Fig. 9). These gripping faces are preferably of rubber, or other resilient material, set in dovetail recesses in the opposing faces of the links.

Figure 10:
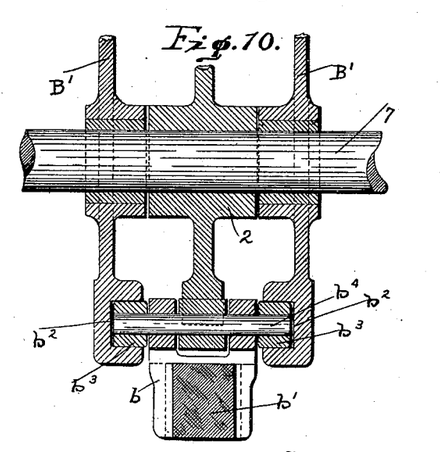
Fig. 10 is a transverse vertical section on line 10—10, Fig. 9.
Figure 11:
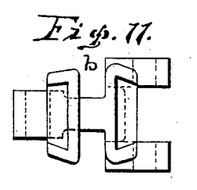
Figs. 11 and 12 are detail views of one of the links of the gripper chain.
Figure 12:
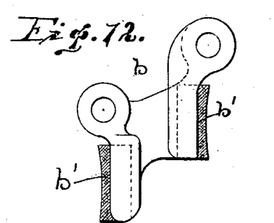

In the operation of the feeding device, the links on leaving the forward sprocket close together, seizing the bundles of fibers and carrying them rearward, and as the links begin to pass up and around the rear sprocket 3 the gripping faces separate, allowing the bundles to fall. In order to insure the forcible clamping of the links, I provide at each side of the conveyer a guide plate $B^1$, provided along its inner lower inner portion with a straight groove $b^2$, in which run rollers $b^3$ on the ends of the pivots $b^4$ of the links, as illustrated in Fig. 10. Further, in order to facilitate the feeding operation, I prefer that the gripping faces shall be set at a slight inclination to the direction of rectilinear movement of the chain, so that, as the links leave the lower portion of the periphery of front sprocket 2, the opening between the gripping faces mouths rearward as well as downward, the result being that the bundles of fiber are readily inserted in the conveyer.

While passing rearward in the grip of the feeding device B, the bundles of fibers are subjected to the action of mechanisms arranged to enter between and pass longitudinally of the fibers, and comprising a comber C and a separator D, both moving in directions transverse to the path of the fibers, but the first operating from the region of the butt of each bundle toward the tip while the other operates in the reverse direction. The comber may be of any suitable construction without destroying the operativeness of the machine, but I prefer to employ the illustrated form, which consists of an endless toothed band, mounted on upright pulleys $c$ beneath the feeding table, the outer of the two pulleys projecting sufficiently above the table to cause the comber to pass upward at a slight inclination through opening $c^1$ in the table, the comber then passing downward through opening $c^2$, in which stands the outer pulley $c$. By this arrangement, the teeth of the comber belt gradually enter the brush of fibers preventing breaking or injury of the latter. The point at which the teeth of the comber begin to enter the fibers is, of course, a little to one side of the conveyer B. After leaving the comber, the brushes, still carried in a direction at right angles to their length, come within the zone of action of the separator D, which is located at the opposite side of the conveyer B from the comber. While this separator, may be of any desired construction, I prefer that it be in the form of a wheel provided on its periphery with suitable teeth or other suitable cutting projections. The separator operates in opening $d$ in the feeding table, and moves upward through the butts of the bundles, ripping the fibers apart.

Figure 3:
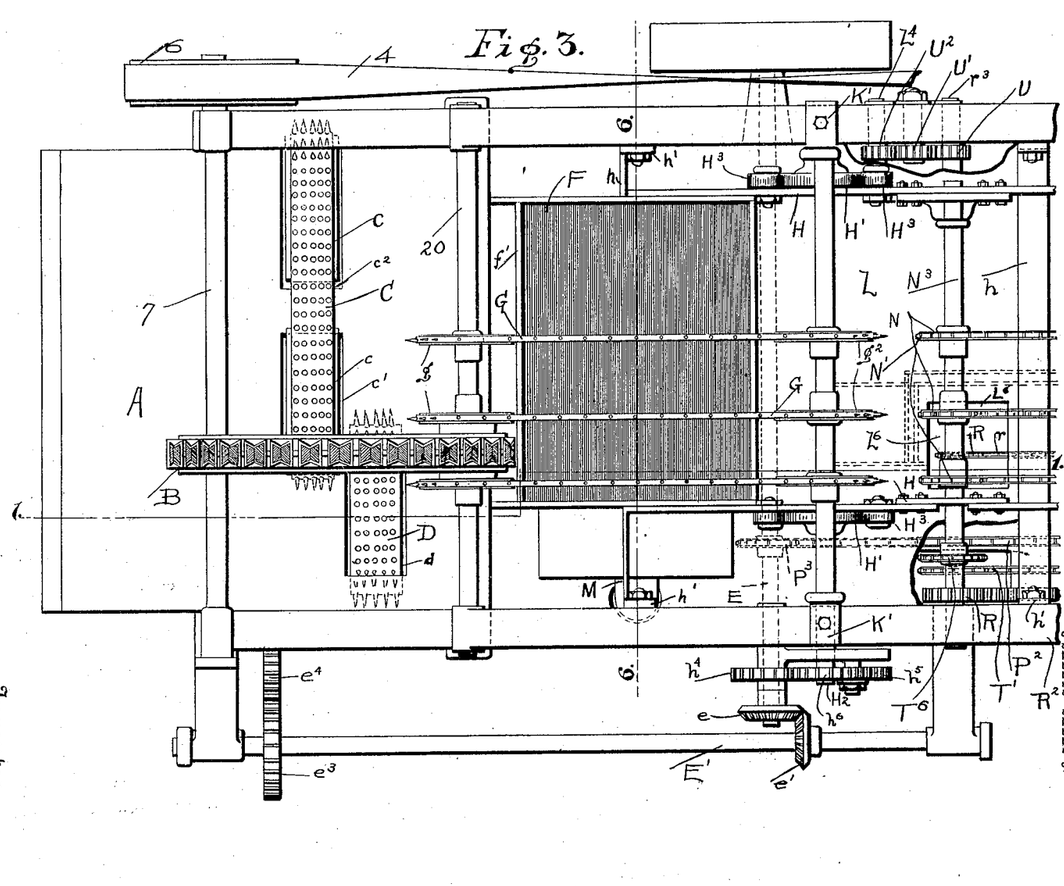
Fig. 3 is a plan view of the front part of the machine.
Figure 5:
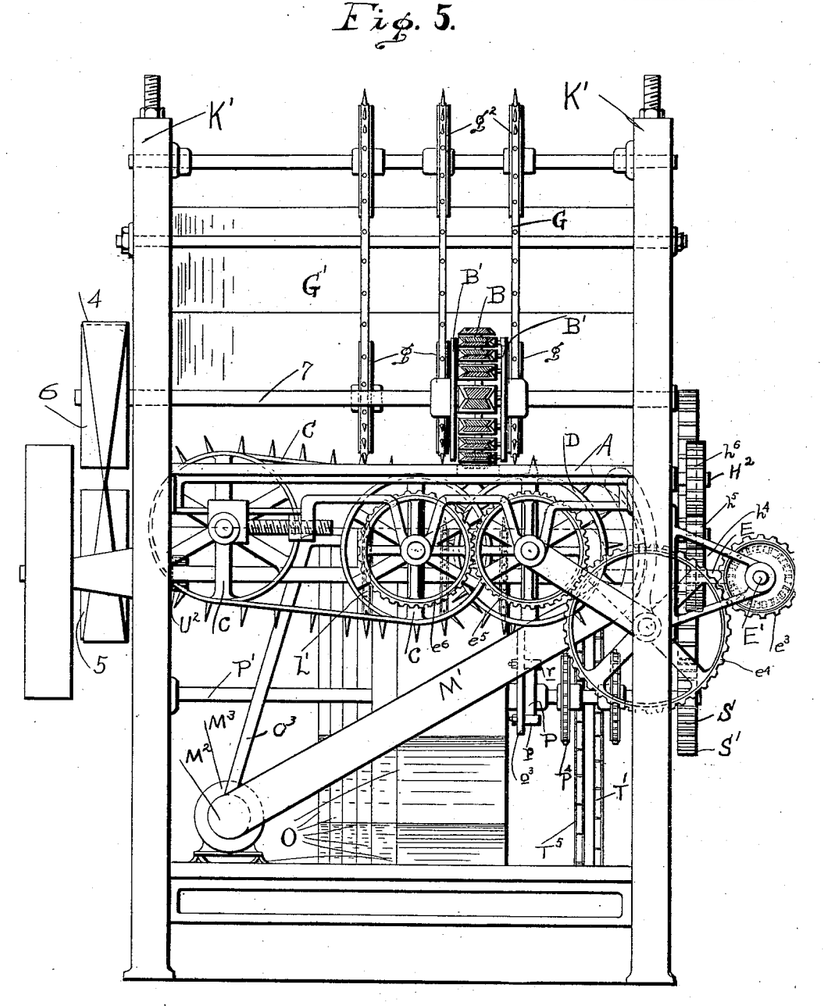
Fig. 5 is a front end elevation.

The comber and separator are driven from the main shaft E, passing across beneath the machine in advance of its center, through meshing bevel gears $e$, $e^1$, longitudinal counter shaft $E^1$ at one side of the machine, gear $e^3$ on the front end of this shaft, intermediate gear $e^4$, and meshing gears $e^5$, $e^6$ on the separator and inner comber shaft respectively (see Figs. 3 and 5).

As the links of the gripper feeding device B pass upward around sprocket 3, the separated fibers are allowed to drop upon reciprocating screen F, over which the fibers are carried by rearward moving toothed conveyers G arranged in parallel above the screen. These conveyers are carried by upright wheels $g$ mounted on shaft 20 of sprocket 3, similar wheels $g^1$ located to the rear of the screen, and wheels $g^2$ located above wheels $g^1$. As the conveyers G pass upward from wheels $g^1$ to $g^2$, they pass in front of an upright wall $G^1$, from the top of which an incline $G^2$ passes downward and rearward to the surface of boarding $g^3$ covering the rear part of the machine.

Figure 1:
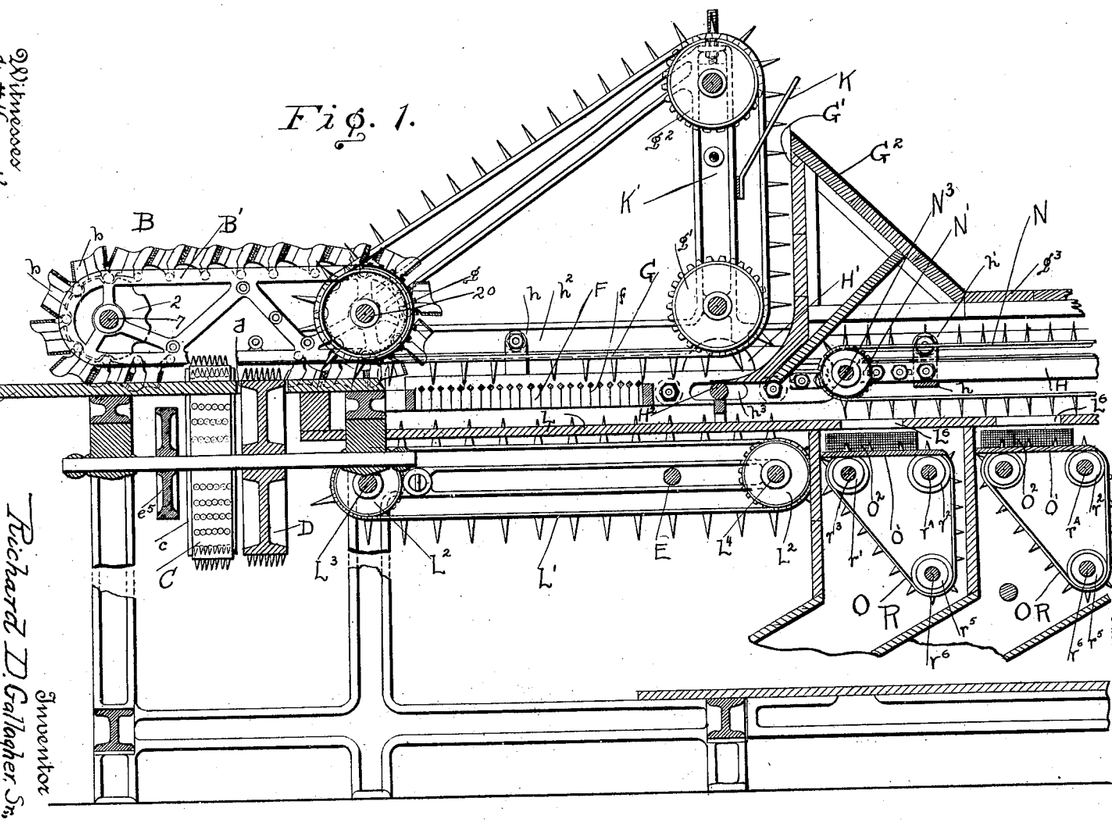
Figure 1 is a vertical longitudinal section, on line 1—1 of Fig. 3, of the forward part of a machine embodying my invention.
Figure 7:
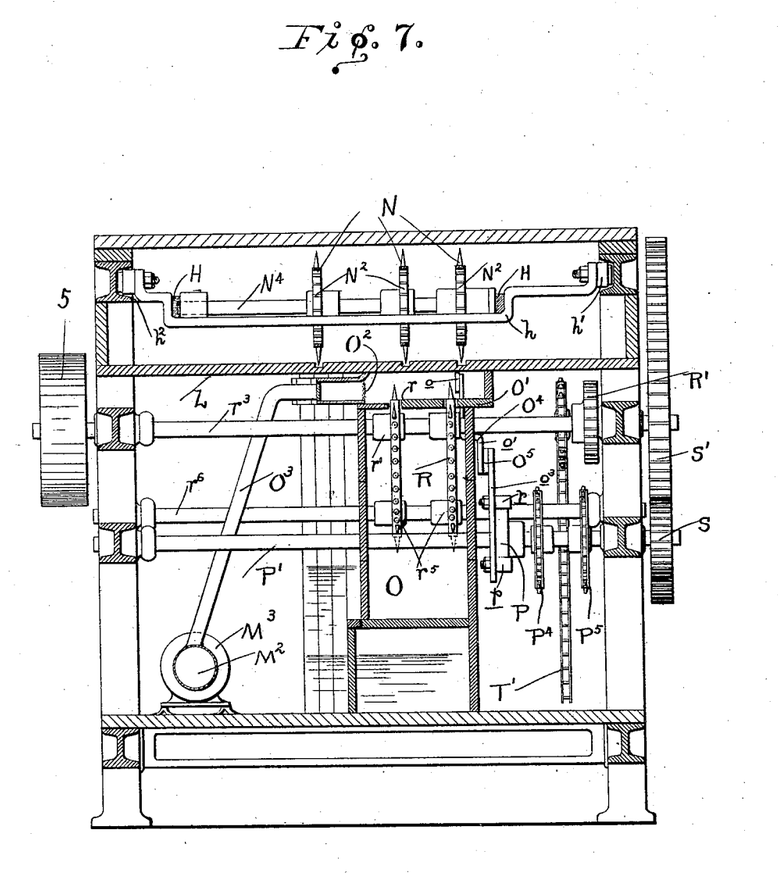
Fig. 7 is a similar section on line 7—7, Fig. 4.

As shown in Figs. 1 and 3, screen F is formed of a plurality of transverse upright plates $f$ provided with enlarged heads, diamond shape in cross section, between which the openings extend all the way across the screen. These plates are set in a frame $f^1$ which is mounted between bars H, which extend at opposite sides of the machine all the way to the rear thereof, and are supported for reciprocatory motion by hangers $h$, provided at their upturned ends with rollers $h^1$, which travel in grooves $h^2$ in the side frames of the machine (see Fig. 7). The frame formed by bars H and the transverse hangers $h$ is given a longitudinal reciprocatory movement by eccentrics $H^1$ located adjacent the two bars and carried by a transverse shaft $H^2$, which passes through slots $h^3$ in the bars and is driven from main shaft E through gear $h^4$ near the end thereof, intermediate gear $h^5$, and gear $h^6$ on the end of the eccentric shaft. The eccentrics operate upon rollers $H^3$ carried by bars H, and impart to the latter a reciprocatory movement of considerable speed, but short throw.
In operation of this part of the machine, the fibers are distributed over the reciprocating screen F, through which all the desirable fibers are caused to fall. The remainder, comprising unserviceable material of various kinds, is carried rearward off the screen, and then upward in front of wall $G^1$, the latter coöperating with the teeth of the conveyers G to retain the material, until the top of the wall is reached, when the waste is forced out from the teeth of the conveyers by upward and rearward projecting deflectors K secured to the upright posts $K^1$ of the machine frame, which support the shafts of conveyer carriers $g^1$ and $g^2$. Upon leaving the conveyers G, the waste slides down incline $G^2$ upon the boarding $g^3$.

Figure 6:
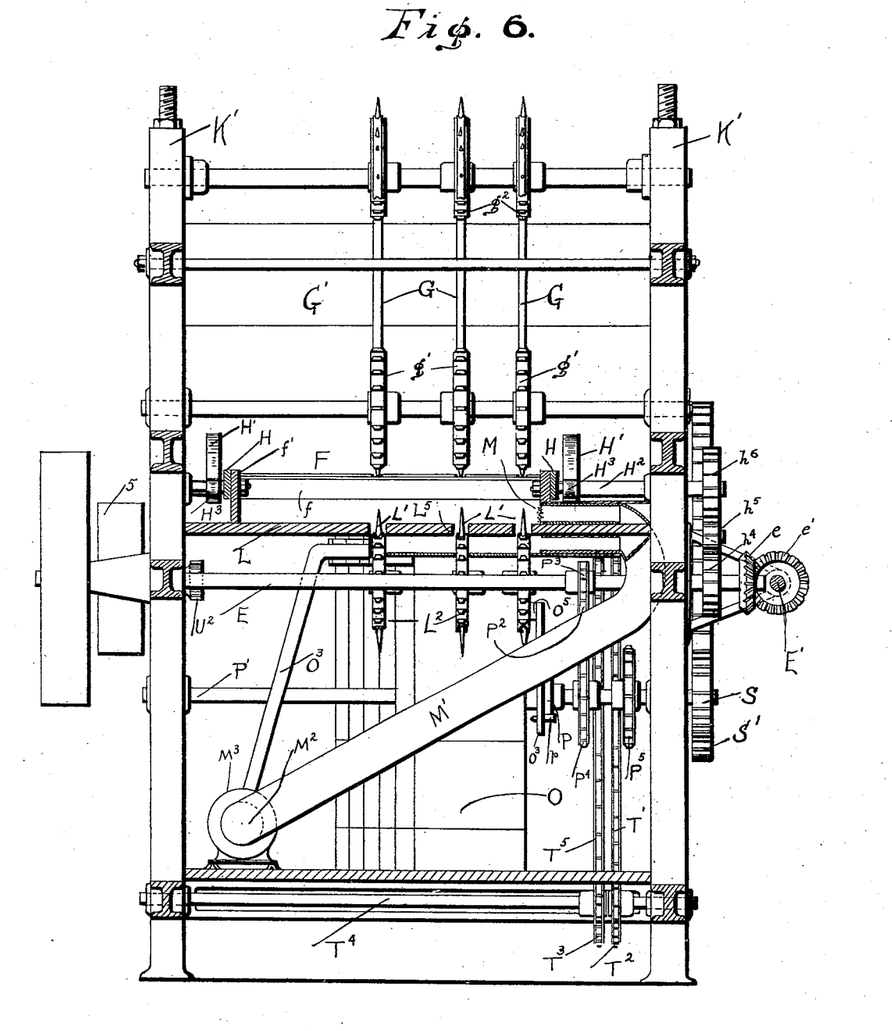
Fig. 6 is a transverse vertical section on line 6—6, Fig. 3.
Figure 8:
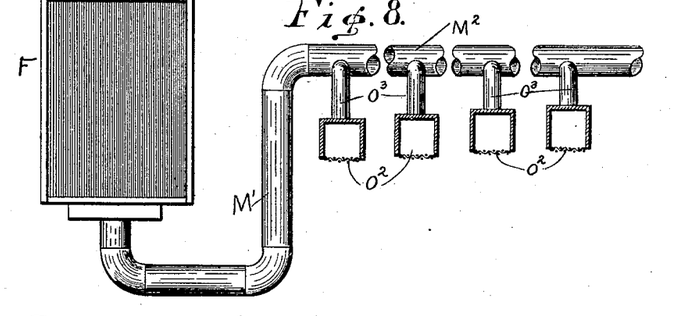
Fig. 8 is a diagrammatic view of the arrangement of the air-blast system.

The fibers that fall through the meshes of the screen, are received by a table L, which extends to the rear of the machine, and are immediately assembled in alinement along their butt-ends against a reticulated screen M (see Fig. 6), which is located upon the same side of the path of travel of the fibers as is separator D, such assembling being effected by means of an air-suction which is created downward through reciprocating screen F, facilitating the passage of the fibers therethrough, and through reticulated screen M, which arrests the fibers. The air blast passes through pipe $M^1$, which leads down through table L and across beneath the latter to a longitudinal air conduit or main $M^2$, which, at the rear of the machine, has a suitable device $M^3$ for creating a suction (see Figs. 6 and 8).

While being assembled against reticulated screen M, the fibers are being carried rearward by endless toothed conveyers $L^1$, mounted on wheels $L^2$ carried by front and rear transverse shafts $L^3$ and $L^4$ beneath the table L, the teeth of the conveyers projecting through longitudinal slots $L^5$ in the table. The assembled fibers are delivered by conveyers $L^1$ to other longitudinal toothed conveyers N, which, however, are disposed above the table. These last conveyers carry the fibers over a series of graduated openings $L^6$ in table L, which increase in length, (taking as this dimension the one parallel to the length of the fibers), towards the rear of the machine, and which open into a stepped series of bins O, into which the fibers are automatically sorted. This constitutes sorting mechanism for sorting the fibers into lengths, as the screen F constitutes sorting mechanism for sorting the available from the useless material. It will be noted that conveyers $L^1$ underlie table L in order not to obstruct the passage of the fibers through the reciprocating screen F upon the table, while conveyers N overlie the table to permit the fibers to pass through the openings $L^6$ in the latter.

Conveyers N are carried by wheels $N^1$ and $N^2$ secured to transverse shafts $N^3$ and $N^4$, which are mounted in bearings in the longitudinal reciprocating bars H. By reason of this arrangement, the conveyer carriers are adapted to have a simultaneous longitudinal reciprocatory movement, so that the conveyers have a continuous travel over the series of graduated openings $L^6$, combined with a longitudinal reciprocatory movement. In this way, the depending teeth of the conveyers not only advance the fibers over the openings, but also serve to shake the fibers through the proper openings, insuring that the fibers intended for the first and smaller openings shall not be matted in with the longer fibers and carried on to the larger openings in rear.

Figure 2:
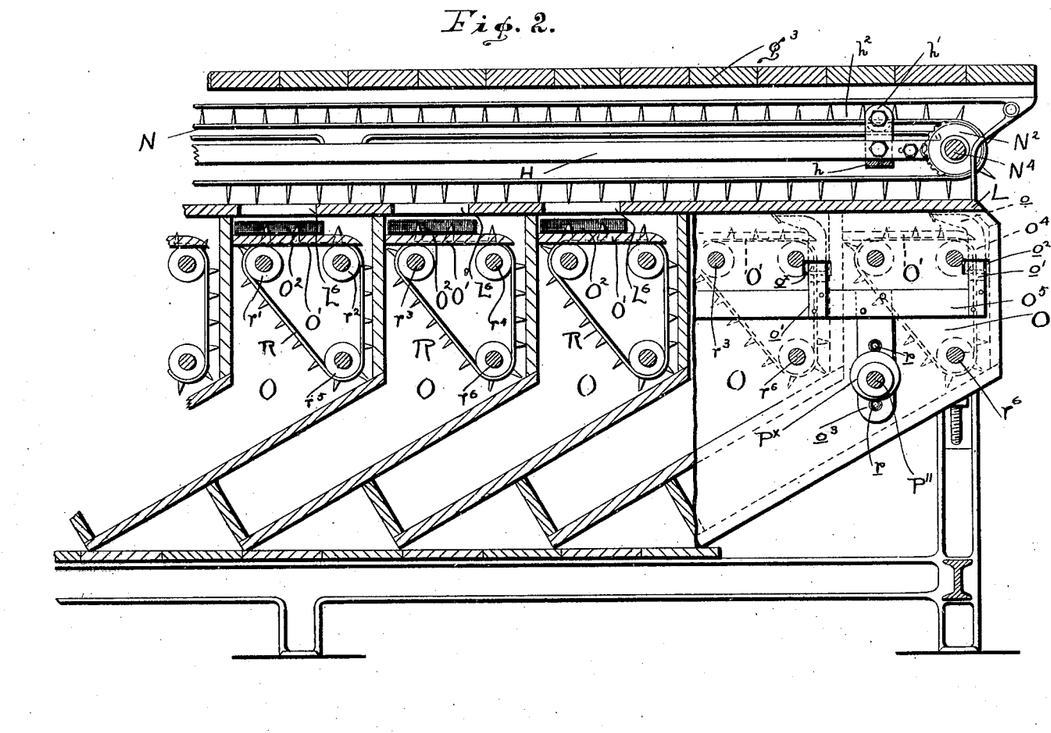
Fig. 2 is a continuation of the section shown in Fig. 1, being taken on line 2—2, Fig. 4.
Figure 4:
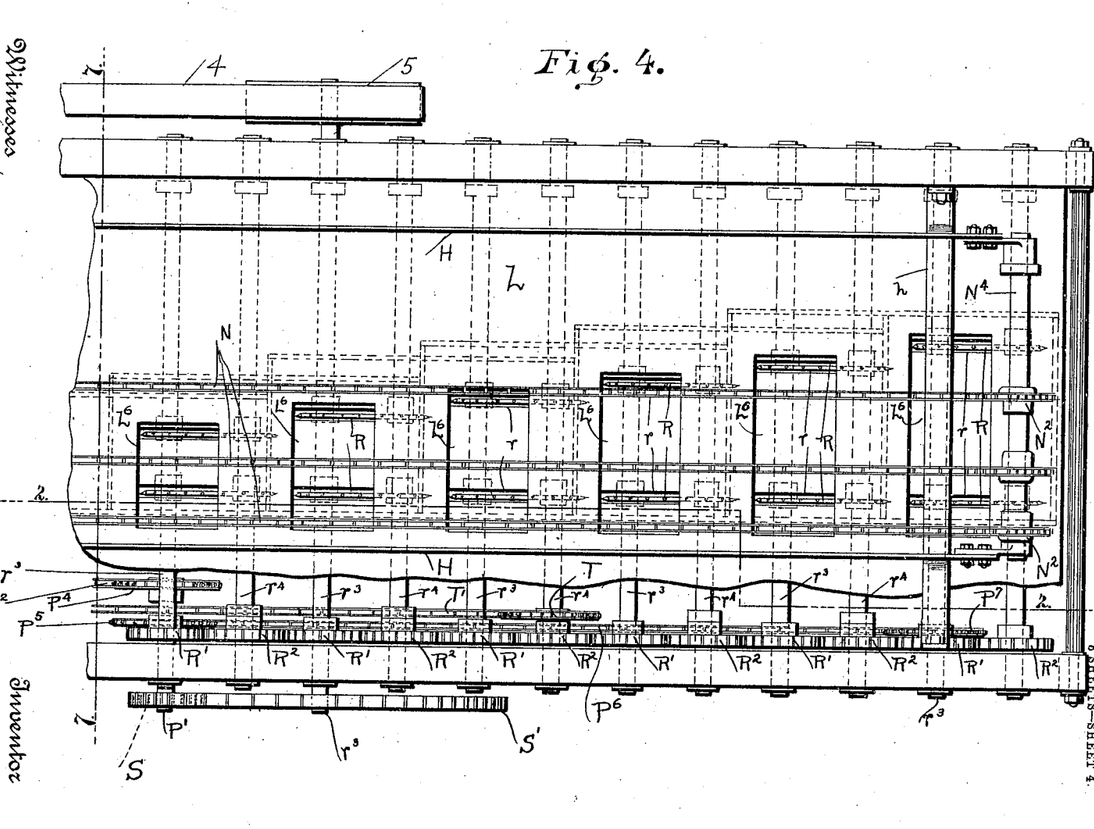
Fig. 4 is a plan view of the rear part of the machine with the covering boarding shown in Fig. 2 removed, this view being a continuation of Fig. 3.

Since the fibers have been alined along their butt-ends, the lateral edges of openings $L^6$ that are adjacent the travel of these butt-ends are arranged substantially in alinement. On falling through these openings, the fibers are received upon shelves $O^1$ located in the upper portions of the bins O. Here they are again alined in a manner similar to that employed for alining the fibers after passing through screen F, but this time along their tip ends. For this purpose, the wall of each bin adjacent the tip ends of the fibers therein is provided above the shelf with a reticulated upright screen $O^2$, through which an air suction is produced through branch pipes $O^3$, which lead into the main conduit $M^2$. This air suction alines the fibers immediately upon falling on the shelf $O^1$ and prepares them for the trimming operation. This latter is performed in the several bins by vertically reciprocating knives $O^4$, whose horizontal blades $o$ operate against the surfaces of the shelves just within the walls adjacent the butt-ends of the fibers and trim off these butt-ends, bringing the fibers in each bin exactly to a size. Each knife has a depending stem $o^1$ which angles out through an opening $o^2$ in the wall of the bin and is secured at its lower end to a common knife bar $O^5$, which extends longitudinally outside of the bins (see Figs. 2 and 7). Vertical reciprocatory movement is imparted to the knife bar by means of eccentrics P, $P^\times$, located near the front and rear of the bar and operating against rollers $p$ mounted on depending arms $o^3$. Eccentrics P are secured to transverse shafts $P^1$, $P^{11}$, which pass through the second and last bins and are driven by chain $P^2$ which passes from sprocket $P^3$ on the main shaft (see Figs. 3 and 6) downward and rearward to sprocket $P^4$ on knife shaft $P^1$. From a second sprocket $P^5$ on shaft $P^1$ a chain $P^6$ passes rearward to sprocket $P^7$ on shaft $P^{11}$ (see Fig. 4).

In each bin, the alined and trimmed fibers are carried over the rear edge of the shelf $O^1$, to drop into the lower part of the bin, by means of toothed conveyers R, which are located beneath the shelf and whose teeth travel through slots $r$ therein. Each conveyer passes over two carriers $r^1$, $r^2$, at front and rear of the bin, respectively, and carried by transverse shafts $r^3$, $r^4$, these shafts of all the bins being in the same horizontal plane immediately below the shelves, and over a lower carrier $r^5$ secured to transverse shaft $r^6$. There are preferably two conveyers in each bin, both mounted on carriers arranged in transverse alinement and secured to the same shafts.

Conveyers R are driven in the following manner: S indicates a small gear borne by knife-bar shaft $P^1$ at one side of the machine and meshing with large gear $S^1$ secured to the end of shaft $r^3$ of the third bin. The several shafts $r^3$ and $r^4$ are provided with meshing gears $R^1$ and $R^2$, the former being fast on their shafts $r^3$ and the latter loose on shafts $r^4$, with the result that gears $R^1$ and $R^2$ revolve in opposite directions. Since gears $R^1$ are fast on the shafts $r^3$ and gears $R^2$ are loose on shafts $r^4$, shafts $r^3$ are driven positively in the direction of gears $R^1$ and shafts $r^4$ are driven through conveyers R in the same direction in opposition to the movement of gears $R^2$. This arrangement of gearing is shown more particularly in Figs. 4 and 7, in the former view one side of table L being broken away to show the mechanism beneath.

The remainder of the gearing of the machine will now be discussed. The shaft $r^3$ that bears large gear $S^1$ carries at its opposite end (see Fig. 4) the pulley 5 already described as driving gripper conveyer B and toothed conveyers G at the front of the machine. The toothed conveyers $L^1$, which transport the fibers after falling through screen F, are driven in a manner more clearly shown in Fig. 3, part of the table L at the left of the machine being shown as broken away in this view for the purpose of clear illustration in this connection. The shaft $r^3$ of the first bin bears at one end outside of the bin a small gear U, which meshes with intermediate gear $U^1$, which meshes in turn with a third small gear $U^2$ (see also Fig. 5) on the end of rear shaft $L^4$ of conveyers $L^1$. Conveyers N are given their continuous travel by means of sprocket T (see Fig. 4), which is carried by shaft $r^3$ of the fourth bin, chain $T^1$ leading forward and downward from said sprocket, sprocket $T^2$ at the bottom of the machine driven by said chain, second sprocket $T^3$ mounted on the same transverse shaft $T^4$ with sprocket $T^2$, chain $T^5$ leading upward from sprocket $T^3$ (see Fig. 6), and sprocket $T^6$ which is carried by the end of front conveyer shaft $N^3$ and receives chain $T^5$.

While, for the sake of illustrating an operative machine, I have shown certain arrangements of gearing, I wish it to be understood that I do not consider the specific operative connection of parts as forming any essential part of the invention.

The operation of the machine will now be briefly reviewed. The bundles of fibers are fed to the gripper conveyer B, carried thereby to the screen F, and distributed over this screen by the toothed conveyers G, the fibers falling through the transverse openings in this reciprocating screen, while the stalks and other waste are carried on by conveyers G in front of wall $G^1$ and deposited upon the surface of the machine. The passage of the fibers through the screen is materially assisted by the air blast; and the alining of the fibers at their butt-ends, instead of at their tip-ends, against the reticulated screen at this point, insures that the fibers will not be bent and matted by the air blast. The fibers are now in condition to be sorted through the graduated openings $L^6$, and are delivered by conveyers $L^1$ to conveyers N, which latter carry the fibers over the openings and by their reciprocating movement cause said fibers to fall promptly through the proper openings. The fibers in each bin are now realined along their tip-ends by means of the air-suction; trimmed along their opposite ends by the knives, and deposited by conveyers R in the bottoms of the bins. It will be obvious that, as in the case of screen F, the air-suction operates to draw the fibers down through the openings $L^6$.

What is claimed as new is:

1. In a fiber sorting machine, the combination with feeding mechanism adapted to carry bundles of fibers; of a comber positioned to be supplied by said feeding mechanism, a separator for severing the individual fibers from each other located in rear of the comber, conveyer mechanism for transporting the separated fibers, and a table over which said conveyer travels provided with a series of graduated sorting openings increasing in size rearward through which the fibers of increasing size fall successively.

2. In a broom fiber sorting machine, the combination with sorting mechanism for grading the individual fibers; of a gripper conveyer located in advance of said sorting mechanism and constructed to transport fiber bundles laterally, a comber located at one side of the conveyer and operating transversely away from its path of travel to operate upon the fiber bundles while held by said conveyer, and a separator located in rear of the comber at the other side of the conveyer and operating transversely away from said conveyer also to operate upon the fiber bundles while held thereby.

3. In a fiber sorting machine, the combination with feeding mechanism; of a separator adapted to be supplied with bundles of fibers by said feeding mechanism and constructed to sever the individual fibers from each other, a reciprocating screen provided with elongated parallel openings through which the separated fibers pass, conveyer mechanism located beneath said screen, and a table underlying said conveyer mechanism and provided with a series of graduated sorting openings increasing in size rearward through which the screened fibers of increasing length fall successively.

4. In a broom fiber sorting machine, the combination of a screen, means for creating an air suction therethrough for alining the fibers along their ends against the screen, and means for sorting the alined fibers into lengths.

5. In a broom fiber sorting machine, the combination of a screen, means for creating an air suction therethrough for alining the fibers along their ends against the screen, a table provided with a series of graduated sorting openings increasing in size rearward and having one set of their edges substantially in alinement, and conveyer mechanism for transporting the alined fibers over said openings with the alined ends of the fibers adjacent the alined edges of the openings.

6. In a broom corn fiber sizing machine, the combination of a screen, means for creating an air suction therethrough for alining the fibers along their ends against the screen, and means for trimming the opposite ends of the fibers.

7. In a broom fiber sorting machine, the combination of means for alining the fibers along their butt-ends, conveyer mechanism for transporting the alined fibers, a table underlying said conveyer mechanism and provided with a series of graduated sorting openings through which the fibers fall having their edges adjacent the path of the butt-ends of the fibers substantially in alinement, shelves beneath said openings upon which the fibers fall, means for alining the fibers thereon along their tip ends, and mechanism for trimming the butt-ends.

8. In a broom fiber sorting machine, the combination of a screen, an air conduit leading therefrom, and means for creating an air suction through said screen and conduit for alining the fibers with their butt-ends against said screen, conveyer mechanism for transporting the alined fibers, a table underlying said conveyer mechanism and provided with a series of graduated sorting openings through which the fibers fall having their edges adjacent the butt-ends of the fibers substantially in alinement, shelves beneath said openings upon which the fibers fall, a screen above each shelf, a branch pipe between each of the last-named screens and the conduit to create an air suction through the screens, said screens being arranged adjacent the tip ends of the fibers to aline them along these ends, and trimming mechanism for alining the butt-ends.

9. In a fiber sorting machine, the combination with a table provided with a series of graduated sorting openings, of a conveyer for transporting the fibers over said openings to permit them to fall therethrough, having a continuous forward travel combined with a reciprocating movement.

10. In a fiber sorting machine, the combination with a table provided with a series of graduated sorting openings, a conveyer located over said openings, for transporting the fibers to fall therethrough, wheel carriers upon which said conveyer is carried, and means for imparting a simultaneous longitudinal reciprocating movement to said carriers.

11. In a fiber sorting machine, the combination with a table provided with a series of graduated sorting openings, an endless conveyer having a continuous travel over said openings and provided with teeth ararnged to depend above the table to transport the fibers over said openings, wheel carriers upon which the conveyer is mounted, and means for imparting a simultaneous longitudinal reciprocating movement to said carriers.

12. In a fiber sorting machine, the combination with a longitudinal frame, and means for imparting reciprocating movement to said frame; of a screen mounted in the forward part of said frame and provided with elongated parallel openings through which the fibers fall, a table located beneath said screen and provided in rear thereof with a series of graduated sorting openings, transverse shafts mounted in the rear portion of the frame, a conveyer carried by said shafts and disposed above the graduated openings, and means for giving said conveyer a continuous travel to distribute the screened fibers through said openings.

13. In a fiber sorting machine, the combination with a screen provided with elongated parallel openings through which the fibers fall, a table located beneath said screen and provided in rear thereof with a series of graduated sorting openings, the portion of said table immediately beneath said screen having a longitudinal slot; of an endless conveyer mounted beneath said slotted portion of the table and provided with teeth arranged to travel through the slot and project above the surface of the table, and a second endless conveyer mounted above the apertured portion of the table and provided with teeth arranged to project downward and travel over the surface thereof.

14. In a sorting machine, the combination with a table having a series of graduated sorting openings, and conveyer mechanism arranged to transport the fibers over the table to permit them to fall through said openings; of a series of bins beneath the openings, each bin being provided in its upper portion with a slotted shelf upon which the fibers fall, trimming mechanism for bringing the fibers to a size, and conveyer mechanism operating in the slotted shelf to carry the sized fibers over the edge thereof into the lower portion of the bin.

15. In a fiber sorting mechanism, the combination of a carrier constructed to convey broom-corn, and a comber comprising a traveling belt provided with teeth and arranged at an incline to the path of said carrier, whereby said teeth enter gradually between the broom-corn fibers as they pass along the length of said fibers.

16. In an apparatus of the character described, the combination of a carrier constructed to convey broom-corn, a comber arranged in the path of said carrier, means constructed to sever the broom-corn fibers from each other, and a screen constructed to separate the fine fibers from the stalks and coarse particles, said screen comprising a series of vertical plates provided with enlarged heads.

17. In an apparatus of the character described, the combination of a carrier constructed to convey broom-corn, a comber arranged in the path of said carrier, means constructed to sever the broom-corn fibers from each other, a screen constructed to separate the finer fibers from the stalks and coarse particles, a second screen arranged below the first and adjacent to one side thereof, and means constructed to induce a current of air progressively through said first and second screens and thereby assemble the screened fibers with their ends against said second screen.

18. In an apparatus of the character described, the combination with feeding mechanism, of means constructed to sever the individual broom-corn fibers from each other, a screen constructed to separate the fine fibers from stalks and coarse material, endless carriers provided with projections disposed to travel immediately above the surface of the screen and remove the stalks and coarse particles therefrom, and means arranged adjacent the path of said carriers and constructed to remove such material.

19. In a fiber sorting machine, the combination of a carrier constructed to carry broom-corn, a comber arranged in the path of said carrier, means constructed to sever the broom corn fibers from each other, a screen constructed to separate the fine fibers from the stalks and coarse material, means constructed to assort the screened fibers into desired lengths, and means constructed to assemble the asorted fibers with their fine tip ends in juxtaposition.

20. In an apparatus of the character described, the combination of feeding mechanism, a comber arranged in the path of such feeding mechanism, means constructed to sever the broom-corn fibers from each other, a screen constructed to separate the fine fibers from stalks and coarse particles, means constructed to assort the screened fibers into desired lengths, means constructed to assemble the assorted fibers with their fine tips in juxtaposition, and means constructed to trim the butt-ends of such assembled fibers to bring the fibers to a uniform length.

21. In a fiber sorting machine, the combination with mechanism for entering between and passing longitudinally of the fibers, and with sorting mechanism, of an endless feeding device passing adjacent the field of operations of said first-named mechanism and constructed to hold the fibers securely while operated upon thereby, said feeding device comprising a series of gripping jaws arranged to receive the material between them at a feeding point and to deliver the material to said sorting mechanism.

22. In a fiber sorting mechanism, the combination with mechanism for entering between and passing longitudinally of the fibers, and with sorting mechanism, of an endless feeding device passing adjacent the field of operation of said first-named mechanism and constructed to hold the fibers securely while operated upon thereby, said feeding device comprising a series of gripping jaws arranged to present at the feeding point rearward directed closing gripping mouths formed between them and to deliver the material to said sorting mechanism.

23. In a fiber sorting mechanism, the combination with mechanism for entering between and passing longitudinally of the fibers, and with sorting mechanism, of an endless chain feeding device passing adjacent the field of operation of said first-named mechanism and constructed to hold the fibers securely while operated upon thereby, said feeding device comprising links having complementary gripping faces formed between them and arranged to deliver the fibers to said sorting mechanism.

24. In a fiber sorting machine, the combination with mechanism for entering between and passing longitudinally of the fibers, and with sorting mechanism, of wheel carriers, and an endless chain feeding device carried thereby adjacent the field of operation of said first-named mechanism and constructed to hold the fibers securely while operated upon thereby and to deliver the fibers to said sorting mechanism, said feeding device comprising pivoted links having gripping faces extending outward from the plane of the pivots.

25. In a fiber sorting machine, the combination with mechanism for entering between and passing longitudinally of the fibers, and with sorting mechanism, of an endless feeding device passing adjacent the field of operation of said first-named mechanism and constructed to hold the fibers securely while operated upon thereby and to deliver the fibers to said sorting mechanism, said feeding device comprising resilient gripping jaws arranged to close upon the material at a feeding point and to release the material at said sorting mechanism.

26. In a fiber sorting machine, the combination with mechanism for entering between and passing longitudinally of the fibers, and with sorting mechanism, of an endless chain feeding device passing adjacent the field of operation of said first-named mechanism and constructed to hold the fibers securely while operated upon thereby and to deliver the fibers to said sorting mechanism, said feeding device comprising pivoted links having dovetailed sockets extending outward from the plane of the pivots, and resilient gripping faces inserted in said sockets.

27. In a fiber sorting machine, the combination with mechanism for entering between and passing longitudinally of the fibers, and with sorting mechanism, of an endless feeding device passing adjacent the field of operation of said first-named mechanism and comprising a series of jaws arranged to hold the fibers securely between them while operated upon by said mechanism and to deliver the fibers to said sorting mechanism, and of means for holding said jaws closed when adjacent the field of operation of said first-named mechanism.

28. In a fiber sorting machine the combination with mechanism for entering between and passing longitudinally of the fibers, and with sorting mechanism, of an endless chain feeding device constructed to hold the fibers securely while operated upon by the first-named mechanism and to deliver the fibers to said sorting mechanism, said feeding device comprising links having complementary gripping faces arranged to be closed together by the straightening of the chain when adjacent the field of operation of said first-named mechanism.

29. In a fiber sorting machine, the combination with mechanism for entering between and passing longitudinally of the fibers, and with sorting mechanism, of an endless chain feeding device comprising links having complementary gripping faces and operating to convey the fibers within the field of operation of said first-named mechanism and to deliver them to said sorting mechanism, and of a guide arranged to engage with said links when adjacent the field of operation of said first-named means to insure secure gripping of the fibers.

30. In a fiber sorting machine, the combination with a feeding table, opposed wheel carriers mounted thereover, sorting mechanism disposed adjacent one of said carriers, and mechanism operating transversely between said carriers to enter between and pass longitudinally of the fibers; of an endless chain feeding device carried by the carriers, complementary gripping faces formed between the links of the chain and arranged to close together between the carriers, pivot pins connecting the links, rollers mounted on the ends of said pins and a guide located between the carriers for engagement with said rollers to insure the closing of the gripping faces when adjacent the field of operation of said transversely operating mechanism.

In testimony whereof, I affix my signature, in the presence of two subscribing witnesses.

RICHARD D. GALLAGHER, Sr.

Witnesses:
EARLE GAMIN,
RAY E. ADAMS.